United States Patent
Fujishima

(10) Patent No.: US 6,539,472 B1
(45) Date of Patent: Mar. 25, 2003

(54) REBOOT CONTROL UNIT AND REBOOT CONTROL METHOD

(75) Inventor: Mitsushiro Fujishima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/326,794

(22) Filed: Jun. 4, 1999

(30) Foreign Application Priority Data

Feb. 8, 1999 (JP) .......................................... 11-030562

(51) Int. Cl.[7] .......................................... G06F 15/177
(52) U.S. Cl. ................................ 713/2; 710/5; 710/37; 710/48; 710/110; 710/260; 710/316; 713/2; 714/11; 714/13; 714/23
(58) Field of Search ................................ 713/2; 714/13, 714/11, 23; 710/37, 48, 110, 316, 260, 5

(56) References Cited

U.S. PATENT DOCUMENTS

| | | | | |
|---|---|---|---|---|
| 4,484,273 A | * | 11/1984 | Stiffler et al. ................ | 710/110 |
| 5,255,367 A | * | 10/1993 | Bruckert et al. .............. | 714/11 |
| 5,317,501 A | | 5/1994 | Hilpert | |
| 5,530,946 A | * | 6/1996 | Bouvier et al. ................ | 714/23 |
| 6,178,445 B1 | * | 1/2001 | Duwkins et al. ............ | 709/209 |

FOREIGN PATENT DOCUMENTS

| | | |
|---|---|---|
| JP | HEI 4-364514 | 12/1992 |
| JP | HEI 7-64932 | 3/1995 |
| JP | HEI 9-146623 | 6/1997 |

* cited by examiner

*Primary Examiner*—Jeffrey Gaffin
*Assistant Examiner*—Mohammad O. Farooq
(74) *Attorney, Agent, or Firm*—Sughrue Mion, PLLC

(57) ABSTRACT

An input/output circuit in which a reset control circuit is provided in an NC board, and a logic circuit comprising a REG0 register and a REG1 register each for setting an object for reboot processing, two inverters, an AND gate, and an OR gate is provided in the reset control circuit. According to the setting in the registers, a reset signal RST* for starting reboot processing to the NC board while a PC control section is kept on operating is validated by the logic circuit. On the other hand the reset signal RST* is invalidated by the logic circuit when the reboot processing is executed to the PC control section.

6 Claims, 8 Drawing Sheets

FIG.3

| RSTDRV* | RSTDRV | REG0 | REG1 | RST | RST* |
|---|---|---|---|---|---|
| H | 0 | 0 | 0 | 0 | H |
| L | 1 | 0 | 0 | 0 | H |
| H | 0 | 1 | 0 | 0 | H |
| L | 1 | 1 | 0 | 1 | L |
| H | 0 | 0 | 1 | 1 | L |
| L | 1 | 0 | 1 | 1 | L |
| H | 0 | 1 | 1 | 1 | L |
| L | 1 | 1 | 1 | 1 | L |

REBOOT CONTROL UNIT AND REBOOT CONTROL METHOD

FIELD OF THE INVENTION

The present invention relates to a reboot control unit and a reboot control method for a control unit with an auxiliary computer connected to a main computer so as to perform reboot processing discretely to the main computer and auxiliary computer.

BACKGROUND OF THE INVENTION

A control unit using a personal computer (described as PC hereinafter) generally has a control board or a control card (described as NC board hereinafter) with a built-in central processing unit (described as CPU hereinafter) connected to an extended bus of the PC, and provides controls over a device such as a servo amplifier connected to the NC board through operation of the PC. This type of control unit (described as PC-NC unit hereinafter) sometimes stops the operations of the system and performs reboot processing for booting the system again when important initial parameters (described as machine parameters hereinafter) according to machine components such as a number of servo amplifiers and a number of motors connected to the control unit or setting of a series are changed.

A conventional type of PC-NC unit supplies a signal for resetting a control section inside the PC (described as PC control section hereinafter) also to an NC board through an extended bus. Accordingly, even when reboot processing is required to only either one of the PC and NC board, the reboot processing is resultantly executed to both the PC and NC board.

FIG. 7 is a flow chart showing a sequence of processing when a machine parameter is set for making an adjustment to a machine such as a servo amplifier and a motor connected to the conventional type of PC-NC unit. When this processing is started, at first, the machine parameter is set by an operator, and the parameter is inputted into a PC through an input device such as a keyboard or the like connected the PC (step S1).

A PC control section automatically determines whether the inputted parameter can be changed during operation of a system or the system has to be rebooted (step S2), and when it is determined that rebooting is not required, a standby status to input the next parameter is effected. When it is determined that rebooting is required, a notice to that effect is sent to the operator by displaying a message on a display unit connected to the PC. The operator performs reboot operation to the PC-NC unit thereby (step S3).

When the reboot processing is started, the CPU of the NC board ends communications with the servo amplifier or the remote I/O connected to the NC board, ends application software/s operating on the NC board or terminates the driver/s, and ends the operating system (OS) (step S4). The PC control section also ends application software/s operating on the PC, terminates the driver/s (step S5), and ends the operating system (OS) of the PC (step S6).

When the operator resets the PC by operating a reset switch thereof (step S7), the PC control section starts the operating system of the PC (step S8), and starts the driver/s and application software/s for the PC (step S9). While the CPU of the NC board starts the operating system, driver/s, and application software/s of the NC board (step S10). Thus, the CPU of the NC board restarts the system after setting the machine parameter. When a resetting register is provided inside the PC, software may be reset by validating the register with system manager and application software for the PC.

However, during the operation of adjusting the machine parameter, the reboot processing to the PC-NC unit has to frequently be performed, and a sequence of the processing shown in FIG. 7 is executed each time the processing is performed, and so, considerable time is spent in work.

Therefore, a unit enabling resetting of only NC board with a reset button provided on the NC board and a unit enabling rebooting only of a PC while the NC board is operating have been disclosed in, for example, Japanese Patent Laid-Open Publication No. HEI 9-146623.

FIG. 8 is a block diagram schematically showing the conventional type of PC-NC unit which enables rebooting only of the PC. This PC-NC unit 100 has a PC control section 1 and an NC board 2 connected to each other through an expansion slot 16 connected to a PC extended bus 15.

The PC control section 1 comprises a CPU peripheral circuit 13 connected to a CPU 11 and a memory 12 and which in turn is connected to the PC extended bus 15, and operates independently from the NC board 2 according to, for example, the operating system for the PC stored in the memory 12. The NC board 2 also comprises a CPU peripheral circuit 24 connected to a CPU 21, a memory 22, an external-communication interface 23 and which in turn is connected to the expansion slot 16, and operates independently from the PC control section 1 according to, for example, the operating system for the NC board stored in the memory 22. The external-communication interface 23 is connected to a servo amplifier 110 and to a remote I/O unit 120 through a communication cable or the like.

The CPU peripheral circuit 13 of the PC control section 1 is connected to a reset switch 14. When an operator switches this switch 14 is ON, a reset signal is outputted to the CPU 11 and the expended bus 15 and reboot processing of the PC control section 1 is executed. The CPU peripheral circuit 13 also outputs a reset request signal RSTDRV* to the CPU peripheral circuit 24 of the NC board 2 through the expansion slot 16. It should be noted that a signal with "*" added after a sign (e.g., RSTDRV*) in the specification represents a signal which is effective when the potential is relatively low.

The CPU peripheral circuit 24 of the NC board 2 outputs a reset signal to the CPU 21 of the NC board 2 when it receives a reset request signal RSTDRV*, and also outputs a reset signal to the servo amplifier 110 and the remote I/O unit 120 through the external-communication interface 23. The reboot processing of the NC board 2 is executed thereby.

This PC-NC unit 100 has a switch 25 provided on a signal path for the reset request signal RSTDRV* and when this switch 25 is OFF, the reset request signal RSTDRV* is not inputted into the NC board 2 so that only the PC control section 1 is reset.

However, the software processing in the PC control section and NC board is closely related because data is transferred therebetween, hence it is not desirable for the system to forcefully reset only the PC control section by opening a signal path for the reset request signal RSTDRV* through operation of the switch. Conversely, it is also not desirable to forcefully reset only the NC board.

There has been desired a system, when the PC-NC unit is serially connected to an external interface such as a printer during operation of the system or when the PC control section is put out of control for any reason, such that reboot is executed only to a PC and during the reboot processing the NC board can continue to control a servo amplifier and a remote I/O unit on its own.

SUMMARY OF THE INVENTION

It is an object of the present invention to obtain, for the purpose of solving the problems as described above, a reboot control unit enabling performance of reboot processing, in a control unit using a personal computer, discretely to the personal computer and a NC board connected to a bus thereof.

It is another object of the present invention to obtain a reboot control method for performing reboot processing discretely, in a control unit using a personal computer, to the personal computer and a NC board connected to a bus thereof.

In accordance with the present invention, in a register the auxiliary computer is set as an object for reboot processing, so that a logic circuit validates a reset signal for starting the reboot processing to the auxiliary computer while a main computer is kept on operating.

In accordance with the present invention, in a register the main computer is set as an object for reboot processing, so that a logic circuit invalidates a reset signal for starting the reboot processing to the auxiliary computer when the main computer is to be rebooted.

In accordance with the present invention, a plurality of main computers or a plurality of auxiliary computers each have specific information for identification, and any computer as an object for reboot processing is identified by using the information for identification.

In accordance with the present invention, when the auxiliary computer is set as an object for reboot processing, software being used by the auxiliary computer are ended, then the auxiliary computer is reset while the main computer is operating, and the software that was running on the auxiliary computer before resetting is restarted.

In accordance with the present invention, when the main computer is set as an object for reboot processing, data required for operating the auxiliary computer while the main computer is being reboot is stored in the auxiliary computer, software being used by the main computer ended, the main computer is reset while the auxiliary computer is still operating, and the software that was running on the main computer before resetting is restarted.

Other objects and features of this invention will become apparent from the following description with reference to the accompanying drawings.

BRIEF DESCRIPTION OF THE DRAWINGS

FIG. 3 is a view showing a truth table of a logic circuit for the reset control circuit;

DESCRIPTION OF THE PREFERRED EMBODIMENTS

Detailed description is made hereinafter for preferred embodiments of the reboot control unit and reboot control method according to the present invention with reference to the related drawings.

Figure 1:
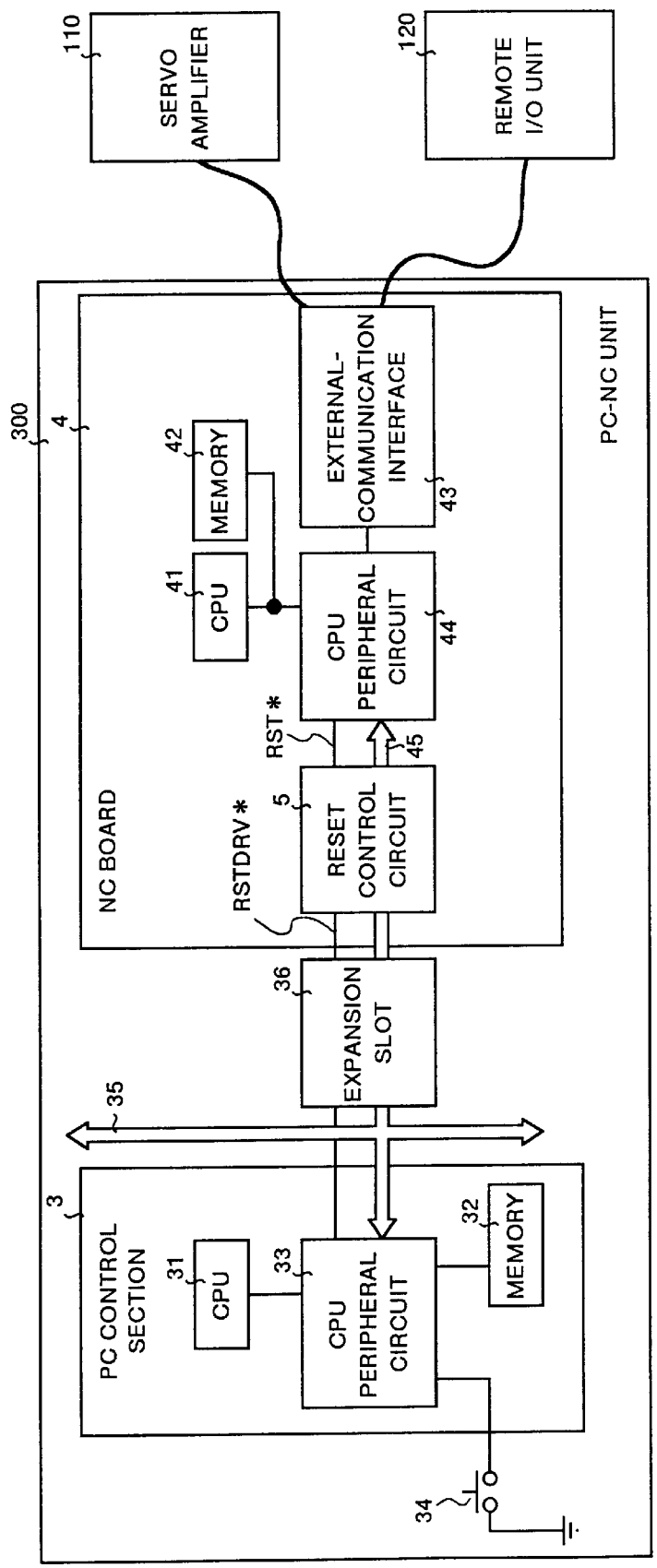
FIG. 1 is a block diagram showing one example of the PC-NC unit according to the present invention.

FIG. 1 is a block diagram showing one example of the PC-NC unit according to the present invention. This PC-NC unit 300 has a PC control section 3 as a main computer and an NC board 4 as an auxiliary computer connected to each other through an expansion slot 36 connected to a PC extended bus 35.

The PC control section 3 comprises a CPU 31, a memory 32, and a CPU peripheral circuit 33. The CPU peripheral circuit 33 is connected to the CPU 31, memory 32, a reset switch 34, and the PC extended bus 35. The PC control section 3 operates independently from the NC board 4 according to, for example, the operating system stored in the memory 32.

The NC board 4 comprises a CPU 41, a memory 42, an external-communication interface 43, a CPU peripheral circuit 44, and a reset control circuit 5 for providing controls for reboot processing to the NC board 4. The reset control circuit 5 is connected to the expansion slot 36 through a bus and also connected to the CPU peripheral circuit 44 through an internal bus 45. The NC board 4 operates independently from the PC control section 3 according to, for example, the operating system for the NC board stored in the memory 42. The external-communication interface 43 is connected to a servo amplifier 110 and a remote I/O unit 120 through a communication cable or the like as equipment to be controlled.

The reset control circuit 5 receives a reset request signal RSTDRV* from the CPU peripheral circuit 33 of the PC control section 3 through the expansion slot 36. This reset request signal RSTDRV* has generally at HIGH level because of a relatively high potential, however it enters into a LOW level having a relatively low potential at the time of reboot processing to the PC control section 3 and is validated.

The reset control circuit 5 outputs a reset signal RST* to the CPU peripheral circuit 44 of the NC board 4, and the CPU peripheral circuit 44 having received this signal outputs the reset signal RST* to the CPU 41 of the NC board 4 and also outputs the reset signal RST* to the servo amplifier 110 and the remote I/O unit through the external-communication interface 43.

Figure 2:
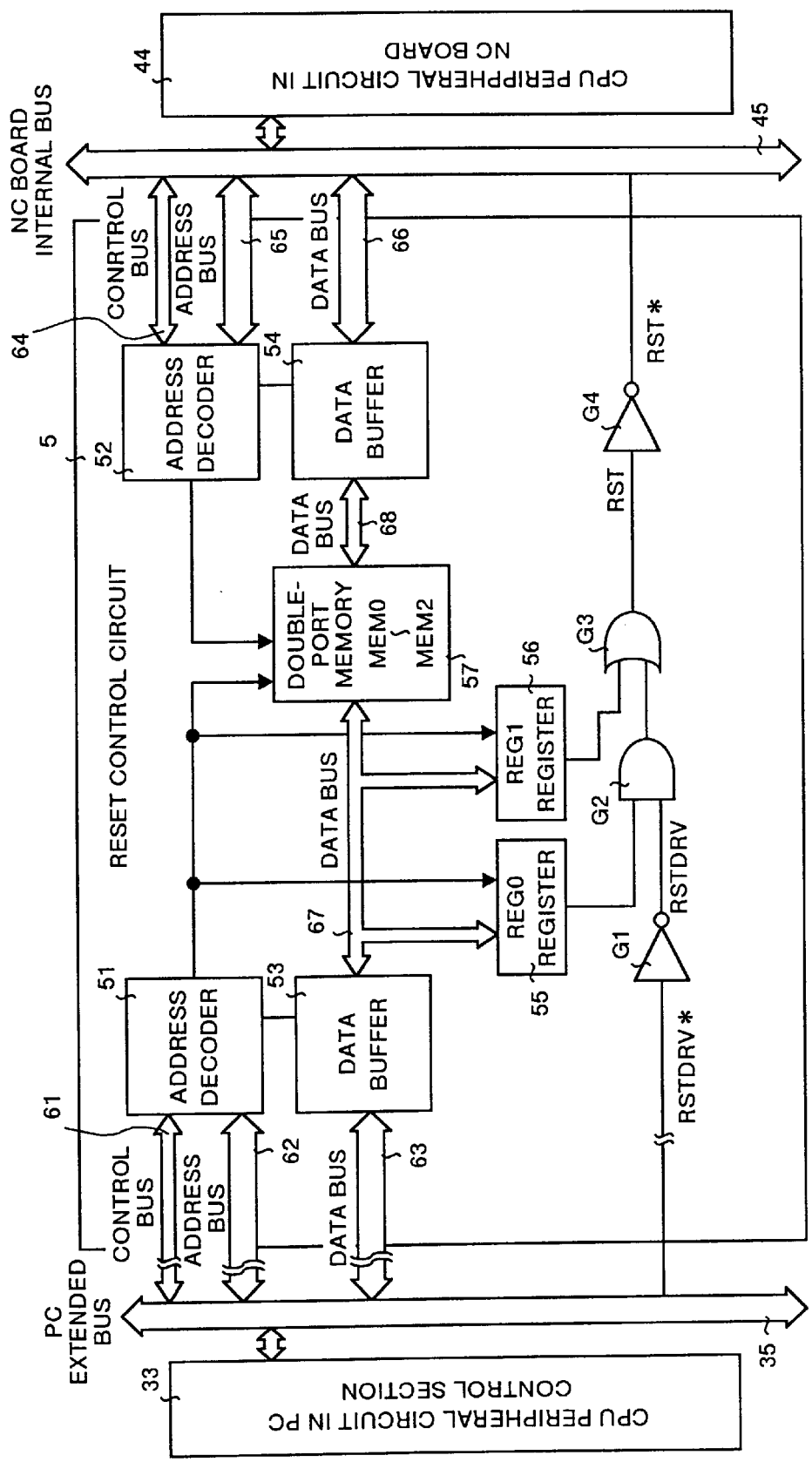
FIG. 2 is a block diagram showing one example of a reset control circuit of the PC-NC unit.

FIG. 2 is a block diagram showing one example of the reset control circuit 5. The reset control circuit 5 comprises two address decoders 51 and 52, two data buffers 53 and 54, two registers 55 and 56, a double-ported memory 57, two inverters G1 and G4, a double-input AND gate G2, and a double-input OR gate G3. It should be noted that the expansion slot 36 is omitted in FIG. 2.

The double-ported memory 57 has two input/output ports and the memory is connected to the data buffer 53 through a data bus 67 and data buffer 54 through a data bus 68. The PC control section 3 and NC board 4 can transact setting data for reboot processing therebetween through this double-port memory 57.

The register 55 and register 56 are connected to the data buffer 53 through the data bus 67. The register 55 and register 56 are described hereinafter as REG0 register 55 and REG1 register 56 respectively to differentiate between the two.

The address decoder 51 is connected to the PC extended bus 35 through a control bus 61 and an address bus 62, and decodes an address outputted to the PC extended bus 35. Further, the address decoder 51 outputs an enable signal to the REG0 register 55, REG1 register 56, and to the double-port memory 57. The data buffer 53 is connected to the PC extended bus 35 through a data bus 63, stores therein data outputted to the PC extended bus 35 once, and transfers the data to the REG0 register 55, REG1 register 56, or the double-port memory 57.

The address decoder 52 is connected to the NC board internal bus 45 through a control bus 64 and an address bus 65, and decodes an address outputted to the internal bus 45. Further, the address decoder 52 outputs an enable signal to the double-port memory 57. The data buffer 54 is connected to the NC board internal bus 45 through a data bus 66, stores therein data outputted to the internal bus 45 once, and transfers the data to the double-port memory 57.

The inverter G1 receives a reset request signal RSTDRV* sent from the CPU peripheral circuit 33 of the PC control section 3 as an input signal, and outputs an inverted signal RSTDRV thereof. The AND gate G2 receives the inverted signal RSTDRV and an output signal from the REG0 register 55 as input signals. The OR gate G3 receives an output signal from the AND gate G2 and an output signal from the REG1 register 56 as input signals. The inverter G4 inverts the output signal RST from the OR gate G3 and outputs a reset signal RST* to the CPU peripheral circuit 44 through the NC board internal bus 45.

FIG. 3 is a truth table showing a relation between reset signals RSTDRV*, values stored in the REG0 register 55, values stored in the REG1 register 56, and reset signals RST*. When the value stored in the REG0 register 55 is "0", namely when the potential of the output signal from the REG0 register 55 is LOW level and if the value stored in the REG1 register 56 is "0" regardless of a potential level of the reset signal RSTDRV*, a reset signal RST* to the NC board becomes HIGH and is invalidated. When the value stored in the REG1 register 56 is "1", namely when the potential of the output signal from the REG1 register 56 is HIGH level, the reset signal RST* becomes LOW and is validated.

When the value stored in the REG0 register 55 is "1" and if the value stored in the REG1 register 56 is also "1", the reset signal RST* becomes LOW and is validated. When the value stored in the REG0 register 55 is "1" and the value stored in the REG1 register 56 is "0", the reset signal RST* is equivalent to the reset request signal RSTDRV*. Namely, if the reset request signal RSTDRV* is valid (namely, LOW level), the reset signal RST* is also validated (namely, LOW level).

Namely, when the value stored in the REG1 register 56 is "1", the reset signal RST* is validated regardless of the level of the reset request signal RSTDRV*. When the value stored in the REG1 register 56 is "0" and if value stored in the REG0 register 55 is "0", the reset signal RST* is invalidated regardless of the level of the reset request signal RSTDRV*. When the value stored in the REG1 register 56 is "0" and the value stored in the REG0 register 55 is "1", the reset signal RST* is equivalent to the reset request signal RSTDRV*.

Accordingly, when both the reset request signal RSTDRV* and the reset signal RST* are HIGH, both of the signals are invalid, and hence reboot processing is not executed in either of the PC control section 3 or the NC board 4.

When the reset request signal RSTDRV* is LOW and the reset signal RST* is HIGH, only the reset request signal RSTDRV* is valid, and hence the reboot processing is executed in the PC control section 3, while the reboot processing is not executed in the NC board 4.

When the reset request signal RSTDRV* is HIGH and the reset signal RST* is LOW, only the reset signal RST* is valid, and hence the reboot processing is not executed in the PC control section 3, while the reboot processing is executed in the NC board 4. When both the reset request signal RSTDRV* and the reset signal RST* are LOW, both of the signals are valid, and hence the reboot processing is executed in both of the PC control section 3 and the NC board 4.

As described above, the values stored in the REG0 register 55 and REG1 register 56 are controlled by the PC control section 3, which allows the reboot processing to be executed to only either the PC control section 3 or the NC board 4 or to both the PC control section 3 and the NC board 4.

Figure 4:
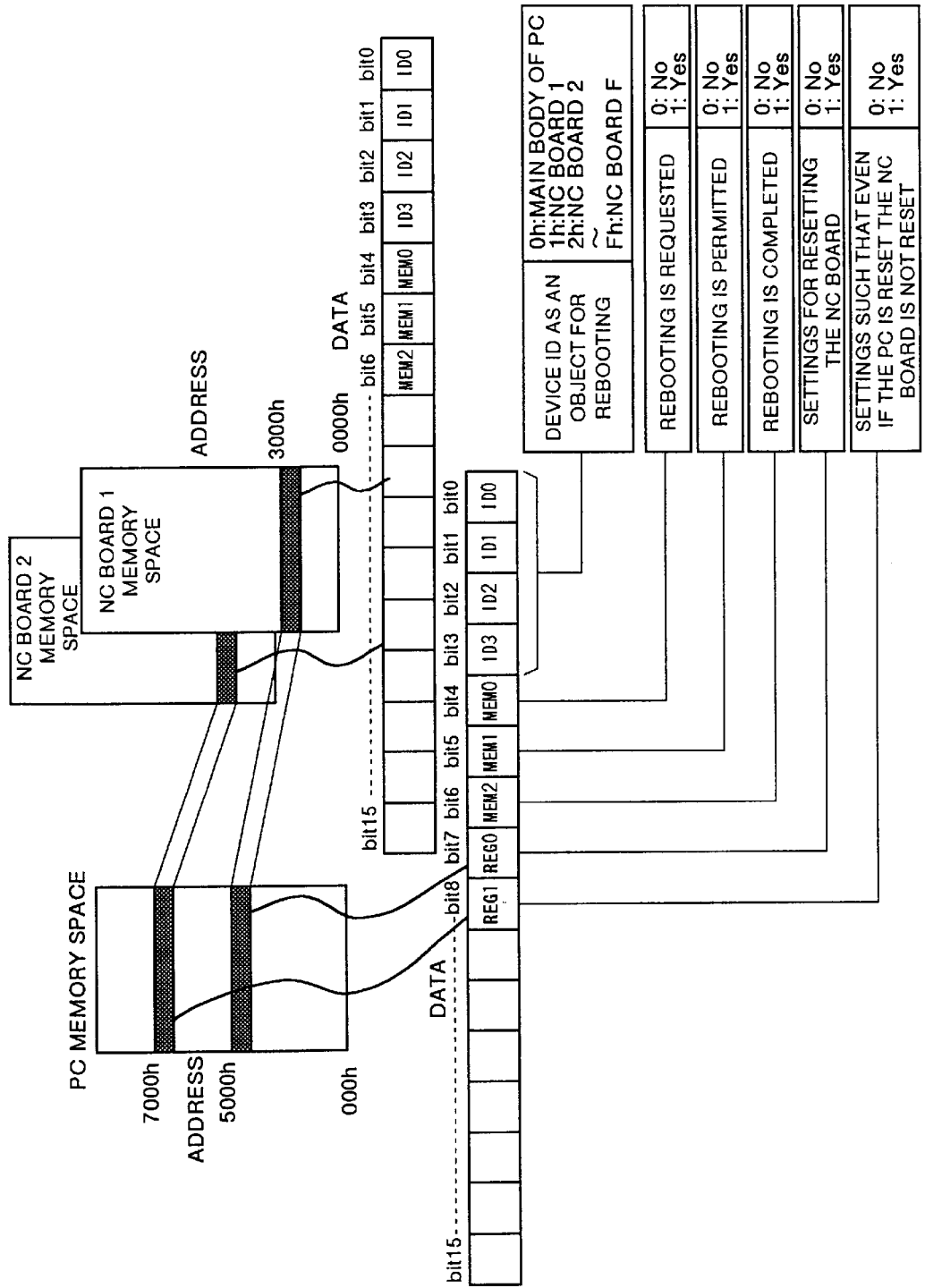
FIG. 4 is a simulated view showing one example of status information for setting data on reboot processing as well as of memory space therefor.

FIG. 4 is a simulated view showing one example of status information for setting data on reboot processing as well as of memory space therefor. In this embodiment, 16-bit data for a particular address, for example, an address of 5000h on memory space accessible from the CPU 31 of the PC control section 3 and 16-bit data for a particular address, for example, an address of 3000h on memory space accessible from the CPU 41 of the NC board 4 are used for allocating reboot setting data for MEM0 to MEM2 and values of REG0 and REG1 for the REG0 register 55 and REG1 register 56 to the address of 5000h on the memory space, and also allocating reboot setting data for MEM0 to MEM2 to the address of 3000h on the memory space.

When the address of 5000h is outputted to the PC extended bus 35, the address (5000h) is decoded by the address decoder 51, while the REG0 and REG1 of the data outputted to the PC extended bus 35 are stored in the REG0 register 55 and REG1 register 56 respectively through the data buffer 53. With this feature, the REG0 register 55 and REG1 register 56 in the reset control circuit 5 can be controlled from the PC control section 3, and hence a combination of the reset request signal RSTDRV* and the reset signal RST* can be controlled. Of the data outputted to the PC extended bus 35 of the PC control section 3, the reboot setting data MEM0, MEM1, and MEM2 is stored in the double-port memory 57 through the data buffer 53.

When the address of 3000h is outputted to the NC board internal bus 45, the address (3000h) is decoded by the address decoder 52, and, of the data outputted to the NC board internal bus 45, the reboot setting data MEM0, MEM1, and MEM2 is stored in the double-port memory 57 through the data buffer 54.

The PC control section 3 accesses the data in the address of 5000h on this memory space periodically, and the NC board 4 accesses the data in the address of 3000h periodically. With this feature, the PC control section 3 and NC board 4 can read or write status information for rebooting, namely the reboot setting data MEM0, MEM1, and MEM2 from or into each address.

For example, MEM0 is the data indicating decision as to whether rebooting is to be requested from the PC control section 3 to the NC board 4 (or from the NC board 4 to the PC control section 3) or not, and the data is "1" when it is decided that the rebooting is requested, and the data is "0" when it is decided that the rebooting is not to be requested. MEM1 is the data indicating decision as to whether rebooting is to be permitted to the side that has requested the rebooting or not, and the data is "1" when it is decided that the rebooting is to be permitted, and the data is "0" when it is decided that the rebooting is not to be permitted. MEM2 is the data indicating decision as to whether a notice to the effect that rebooting has been completed is to be sent to the side that has been permitted the rebooting or not, and the data is "1" when it is decided that the notice is to be sent and the data is "0" when it is decided that the notice is not to be sent.

When there are a plurality of NC boards 4, any device having requested the rebooting writes any of identifying information ID0 to ID3 for a board to be rebooted in the double-port memory 57 and sends the notice to a target device. For example, when requesting rebooting to its own, the PC control section 3 writes 0h (h indicates a hex) in the identifying information ID0 to ID3, when requesting rebooting to the first NC board, the PC control section 3 writes 1h therein, and writes 2h therein when requesting rebooting to the second NC board.

Figure 5:
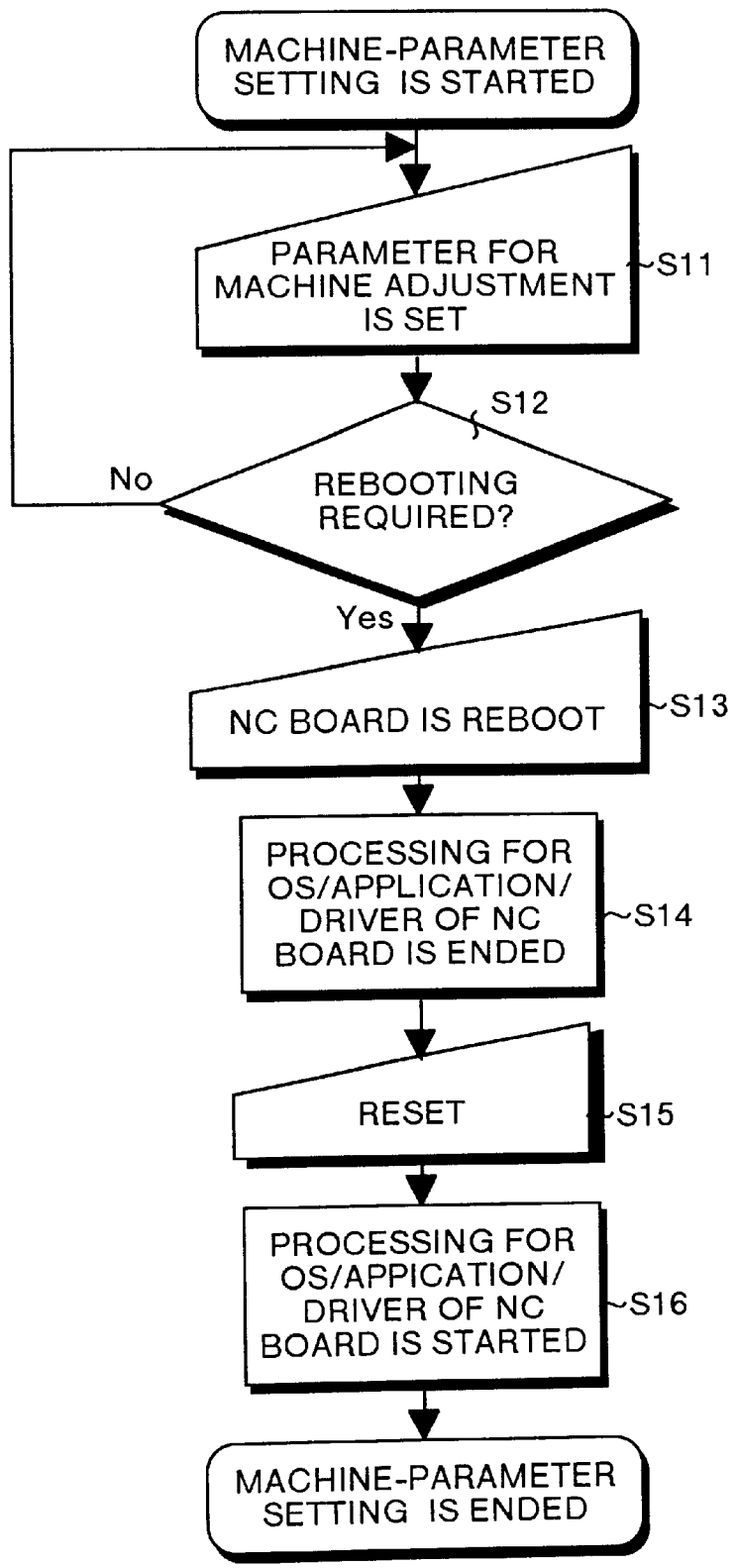
FIG. 5 is a flow chart showing one example of reboot processing only to the NC board of the PC-NC unit.

Next description is made for the processing when the NC board 4 is rebooted for adjusting any machine thereof during operation of the PC control section 3 with reference to FIG. 5. At first, when a machine parameter having set by an operator to adjust a machine such as a servo amplifier and a motor is inputted into the PC-NC unit 300 (step S11), the PC-NC unit 300 determines whether the parameter can be changed without rebooting or the system has to be rebooted once (step S12). When it is determined that rebooting is not required, the PC-NC unit 300 enters a standby status of inputting the next parameter.

On the other hand, when it is determined that the rebooting of the system is required, a notice to that effect is sent to the operator by displaying a message on a display unit. When the reboot operation of the system is executed by the operator (step S13), the PC control section 3 sets, for example, "1" in the MEM0 and requests the NC board 4 to execute the rebooting. When the NC board 4 finds a value of "1" in MEM0 performs the processing such as ending of communications with a device such as the servo amplifier 110 or remote I/O unit 120, ending of the operating system and application software/s running on the NC board 4, and terminating of the driver/s (step S14).

Then, the NC board 4 sets, for example, "1" in MEM1 and permits the rebooting. When the PC control section 3 finds a value of "1" in MEM1 performs the processing such as ending the application software/s running on the PC control section 3 and terminating the driver/s during its execution related to the NC board 4. Further, the NC board 4 rewrites a combination of values of REG0 and REG1 so that the reset request signal RSTDRV* and the reset signal RST* are invalidated and validated respectively. Namely, the PC control section 3 rewrites these values in such a way that the NC board 4 is reset while the PC control section 3 is operating.

When the operator operates the reset switch 34 (step S15), the NC board 4 performs the processing such as starting of the operating system and application software/s running on the NC board 4, starts up the driver/s, and starts communications with the servo amplifier 110 or the remote I/O unit 120 or the like (step S16), and restarts the system after the machine parameter is set. Then, the NC board 4 sets, for example, "1" in MEM2 and sends a notice to the PC control section 3 indicating that the rebooting has completed. When the PC control section 3 finds "1" in MEM2 it restarts the application software/s and driver/s related to the NC board 4.

Figure 6:
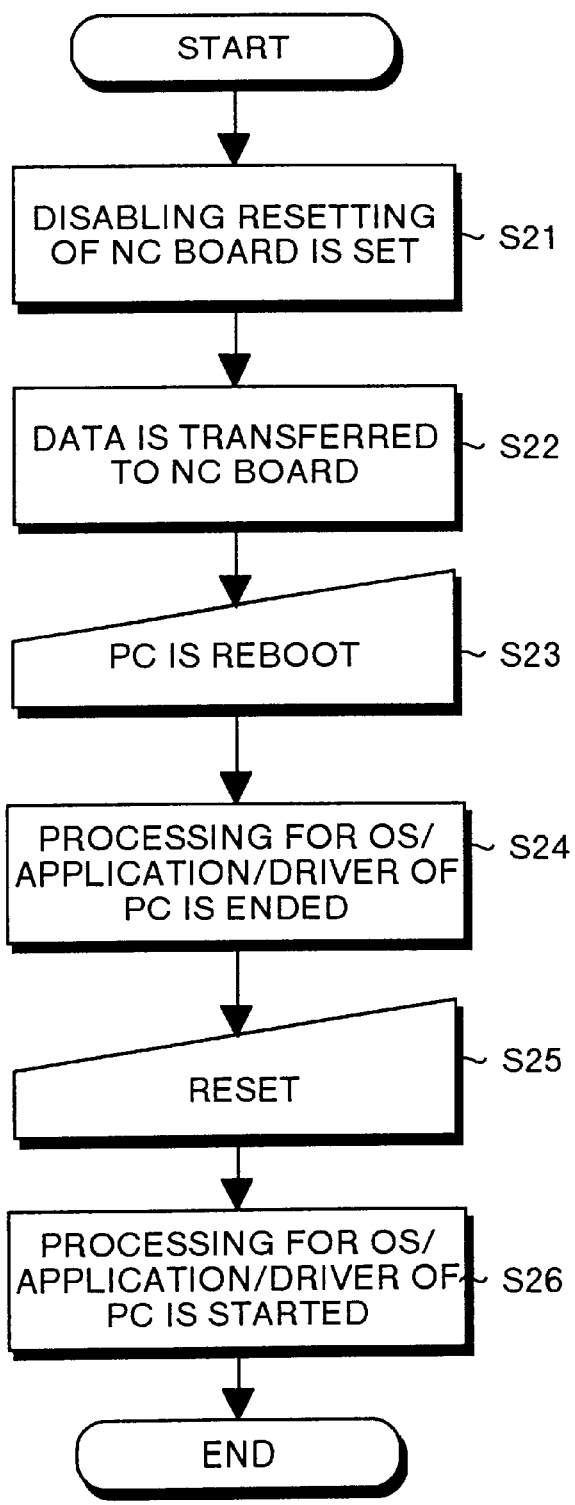
FIG. 6 is a flow chart showing one example of reboot processing only to the PC control section of the PC-NC unit.
Figure 7:
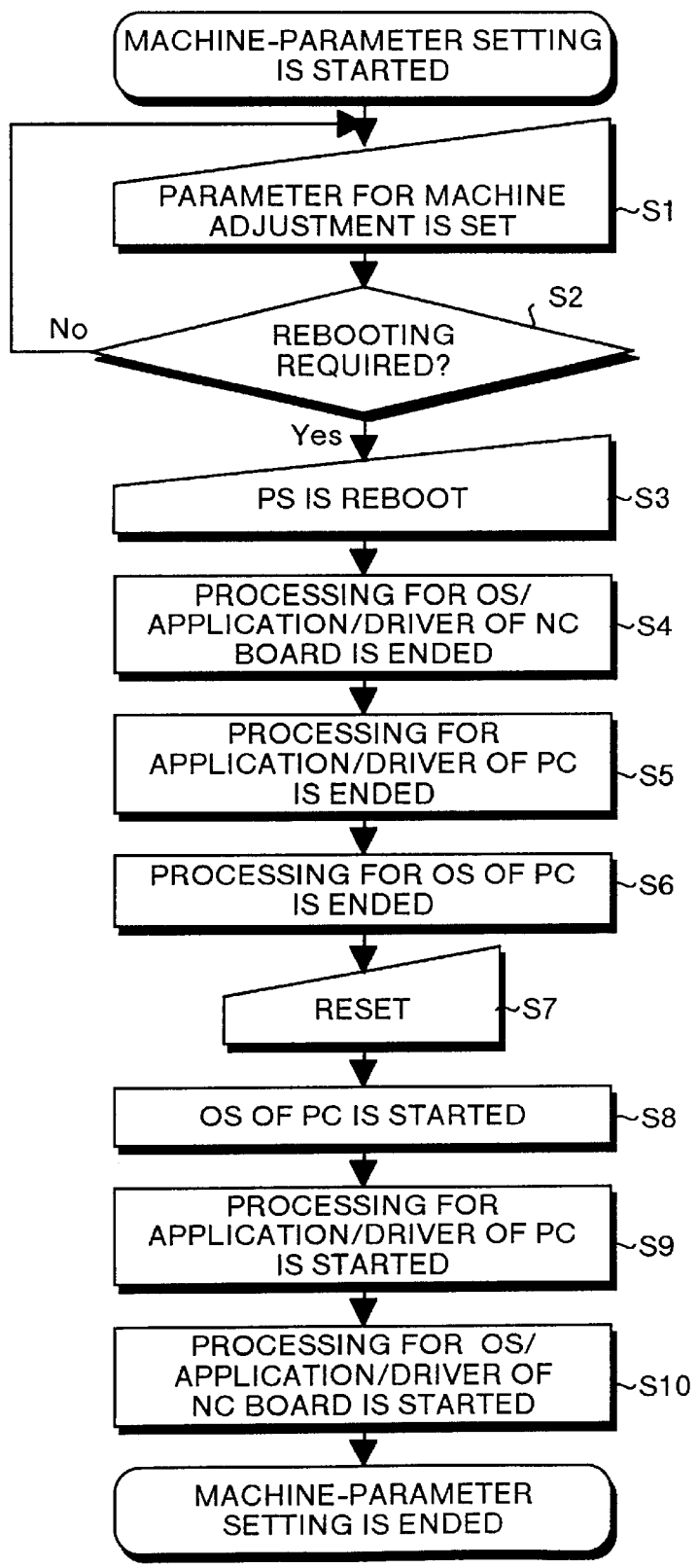
FIG. 7 is a flow chart showing setting of a machine parameter in the conventional type of PC-NC unit.
Figure 8:
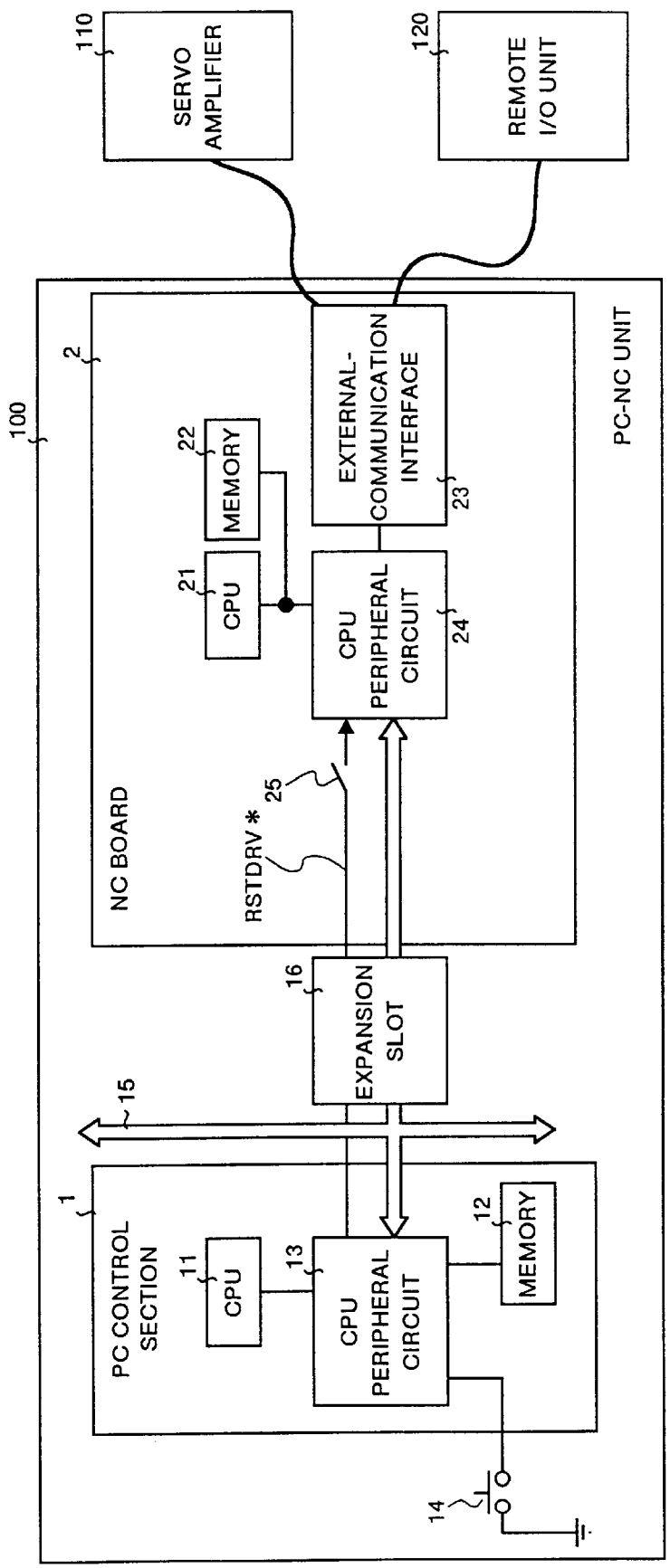
FIG. 8 is a block diagram schematically showing the conventional type of PC-NC unit which enables rebooting of only the PC.

Next, description is made for rebooting only to the PC control section 3 while the NC board 4 is controlling the servo amplifier 110 or the like with reference to FIG. 6. At first, the PC control section 3 rewrites a combination of values of REG0 with REG1 so that the reset request signal RSTDRV* and the reset signal RST* are invalidated and validated respectively. Namely, PC control section 3 rewrites these values in such a way that the PC control section 3 is reset while the NC board 4 is operating (step S21). The PC control section 3 sets, for example, "1" in MEM0, with which a notice that the PC control section itself is to be rebooted is sent to the NC board 4. Namely, the rebooting to the PC control section 3 is requested.

The PC control section 3 transfers all the data required for the NC board 4 to provide controls on its own over the servo amplifier 110 or the like during the reboot processing to a memory such as the memory 42 inside the NC board 4 through the double-port memory 57 and the NC board 4 stores the data therein (step S22). When the data transfer is completed and the NC board 4 enters a status where it can continue the control processing on its own, the NC board 4 sets, for example, "1" in MEM1 and permits the rebooting of the PC control section 3 to the PC control section 3.

The PC control section 3 informs the operator that the rebooting is permitted by displaying a notice on the screen of the display unit or the like. Then the reboot operation of the system is executed by the operator (step S23), the PC control section 3 performs the processing such as ending of the operating system and the application software/s running on the PC control section 3, and terminating the driver (step S24).

When the operator operates the reset switch 34 (step S25), the PC control section 3 performs the processing such as starting of the operating system and application software/s of the PC control section 3, starting the driver/s (step S26), and restarts the system. Then, the PC control section 3 sets, for example, "1" in MEM2, and sends a notice to the NC board 4 indicating that the rebooting has completed. It is assumed herein that the power is supplied to the NC board 4 even when the PC control section 3 is rebooted.

It should be noted that, in place of executing the resetting using a hardware such as the reset switch 34, a software reset may be used in which an ordinary register for reset provided inside the PC control section 3 (not shown) is validated with the help of system manager or application software.

In accordance with the embodiment described above, by setting the REG0 register 55 and REG1 register 56 as required, the reset signal RST* can be validated even when the reset request signal RSTDRV* outputted from the PC control section 3 is invalid, and hence only the NC board 4 can be rebooted without rebooting the PC control section 3, which allows the time required for rebooting the system to be reduced.

Accordingly, in the PC control section 3, it is possible to reduce the rebooting time after parameters for adjustment to machines such as the servo amplifier 110 and remote I/O unit 120 are set. Especially, when a parameter that requires the reboot processing to be performed repeatedly has to be adjusted, the time required for the machine adjustment can be reduced and efficiency of the adjustment operation is enhanced. Then, the present invention is especially effective in a case where much time is required for starting up basic software of the PC control section 3.

In accordance with the embodiment described above, by setting the REG0 register 55 and REG1 register 56 as required, the reset signal RST* can be invalidated when the reboot processing is executed to the PC control section 3, and hence the PC control section 3 can be rebooted while the NC board 4 is continuing to control, which allows machining processing with a machine connected to the NC board 4 to be continued during the reboot processing to the PC control section 3.

In accordance with the embodiment described above, during control processing by the NC board 4, when some other application software having not much to do with the control processing in the PC control section 3 is disabled for any reason, the PC-NC unit 300 can be restored to its normal condition by rebooting only the PC control section 3, so that reliability of the system is enhanced.

It should be noted that the logic circuit section of the reset control circuit 5 is not limited to the configuration with the inverters G1 and G4, AND gate G2, and OR gate G3.

As described above, in accordance with the present invention, in a register the auxiliary computer is set as an object for reboot processing, so that a logic circuit validates a reset signal for starting the reboot processing to the auxiliary computer while a main computer is kept on operating, so that the reboot processing can be executed only to the auxiliary computer.

In accordance with another aspect of the present invention, in a register the main computer is set as an object for reboot processing, so that a logic circuit invalidates a reset signal for starting the reboot processing to the auxiliary computer when the main computer is to be rebooted, so that the reboot processing can be executed only to the main computer.

In accordance with another aspect of the present invention, a plurality of main computers or a plurality of auxiliary computers each have specific information for identification, and any computer as an object for reboot processing is identified by using the information for identification, so that the reboot processing can discretely be executed to the plurality of main computers or the plurality of auxiliary computers.

In accordance with another aspect of the present invention, when the auxiliary computer is set as an object for reboot processing, software being used by the auxiliary computer are ended, then the auxiliary computer is reset while the main computer is operating, and the software that was running on the auxiliary computer before resetting is restarted, so that the reboot processing can be executed only to the auxiliary computer.

In accordance with another aspect of the present invention, when the main computer is set as an object for reboot processing, data required for operating the auxiliary computer while the main computer is being reboot is stored in the auxiliary computer, software being used by the main computer ended, the main computer is reset while the auxiliary computer is still operating, and the software that was running on the main computer before resetting is restarted, so that the reboot processing can be executed only to the main computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A reboot control unit comprising:
    a main computer;
    an auxiliary computer connected to said main computer and a unit to be controlled, said auxiliary computer providing controls together with the main computer over said unit to be controlled;
    a register for setting said auxiliary computer as an object for reboot processing; and
    a logic circuit for validating, while said main computer remains operating, a reset signal for starting the reboot processing of said auxiliary computer according to the setting in said register.

2. A reboot control unit according to claim 1; wherein a plurality of main computers or a plurality of auxiliary computers are connected to each other, each of the computer has specific identification information, and any computer as an object for reboot processing is identified with the help of the specific identification information.

3. A reboot control unit comprising:
    a main computer;
    an auxiliary computer connected to said main computer and a unit to be controlled, said auxiliary computer providing controls together with the main computer over said unit to be controlled;
    a register for setting said main computer as an object for reboot processing; and
    a logic circuit for invalidating, when said main computer is to be rebooted, a reset signal for starting the reboot processing of said auxiliary computer according to the setting in said register.

4. A reboot control unit according to claim 3; wherein a plurality of main computers or a plurality of auxiliary computers are connected to each other, each of the computer has specific identification information, and any computer as an object for reboot processing is identified with the help of the specific identification information.

5. A reboot control unit comprising:
    a main computer;
    an auxiliary computer connected to and operating concurrently with said main computer;
    a unit to be controlled, said auxiliary computer providing controls together with the main computer over said unit to be controlled;
    a register for setting said auxiliary computer as an object for reboot processing; and
    a logic circuit for validating, while said main computer remains operating, a reset signal for starting the reboot processing of said auxiliary computer according to the setting in said register.

6. A reboot control unit comprising:
    a main computer;
    an auxiliary computer connected to and operating concurrently with of said main computer;
    a unit to be controlled, said auxiliary computer providing controls together with the main computer over said unit to be controlled;
    a register for setting said main computer as an object for reboot processing; and
    a logic circuit for invalidating, when said main computer is to be rebooted, a reset signal for starting the reboot processing of said auxiliary computer according to the setting in said register.

* * * * *